July 31, 1956
A. SYNDBAD
2,756,790
SAW BLADE PROTECTING DEVICE
Filed May 27, 1955
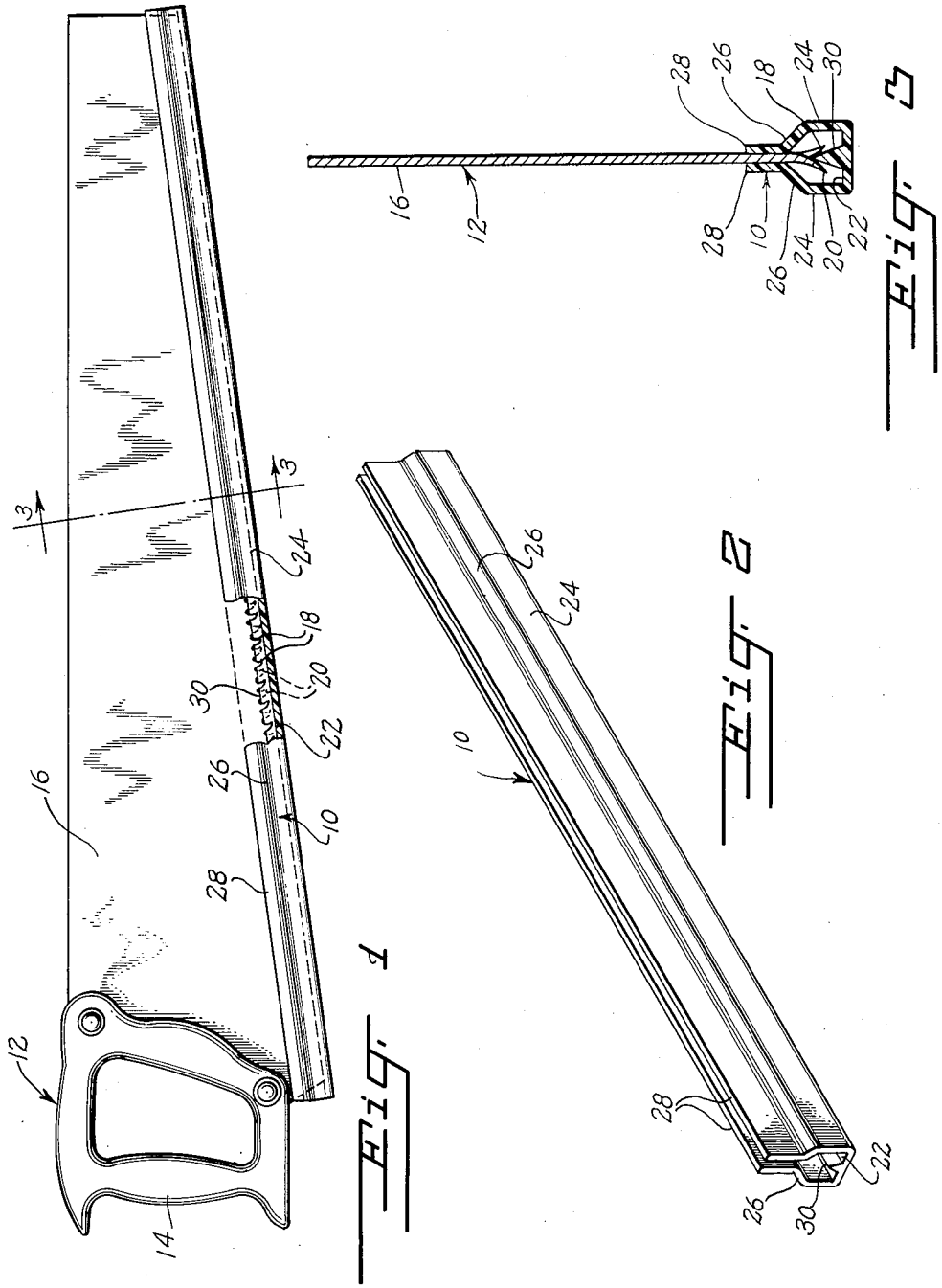
INVENTOR.
Andy Syndbad
BY
McMorrow, Berman & Davidson
Attorneys United States Patent Office 2,756,790
Patented July 31, 1956

2,756,790

SAW BLADE PROTECTING DEVICE

Andy Syndbad, Montvale, N. J.

Application May 27, 1955, Serial No. 511,585

2 Claims. (Cl. 145—35)

This invention relates to protective devices or guards for hand saws, and more particularly has reference to a guard so designed as to be engaged about the cutting edge of a conventional hand saw blade in protective relation thereto, by reason of the inherent elasticity of the blade-contacting portions of the guard.

The main object of the present invention is to provide a generally improved device of the nature referred to, characterized by its simplicity of construction, its ease of application and removal, and by its particular adaptability for protectively enclosing the cutting edge of the saw blade.

A more specific object of the invention is to provide a guard of the type referred to which is particularly adapted for engaging the toothed edge of the protected saw blade in such a manner as to insure that the teeth of the saw will be held against contact with the base or web portion of the guard or any other part thereof.

Another object of importance is to provide a guard as described which can be applied to saws of different types, and will, in each instance, protectively enclose the saw blade without requirement of special connections between the guard and blade.

Yet another object of importance is to form the saw guard in such a manner that the opposite side walls of the guard, and the saw teeth engaging rib of the guard, will be engaged against the opposite faces of the saw blade and against the toothed cutting edge, respectively, in a manner to prevent relative transverse movement of the guard and saw blade, despite the absence of special connections between the guard and blade.

Another object is to provide a device as stated which can be formed inexpensively from plastic, rubber material or the like, the construction being such as to permit construction of the guard from any suitable material having at least a small amount of inherent resiliency, without said material being critical to successful operation of the device.

Other objects will appear from the following description, the claims appended thereto, and from the annexed drawing, in which like reference characters designate like parts throughout the several views, and wherein:

Figure 1 is a side elevational view of a hand saw formed according to the present invention, the saw guard being applied thereto and being shown partially in longitudinal section and partly in side elevation;

Figure 2 is an enlarged perspective view of the saw guard; and

Figure 3 is an enlarged tranverse sectional view through the associated blade and guard, on line 3—3 of Figure 1.

The reference numeral 10 generally designates the saw protecting device formed according to the present invention, and the reference numeral 12 the associated hand saw.

The saw is of fully conventional construction, and includes the usual handle 14 secured to the wider end of the saw blade 16, the saw blade 16 having a toothed cutting edge formed (see Figure 3) with teeth 18 alternating with and set oppositely to teeth 20, thus to define, in effect, a downwardly opening groove between the oppositely set series of teeth 18, 20.

The saw projecting device constituting the present invention is, as shown, formed from a single piece of material. In the illustrated example, plastic as shown may be used, but the material can be rubber or any other material which will have the operating characteristics to be described hereinafter.

The protective device is of U-shaped cross section as shown in Figure 3, having a flat base 22 adapted to extend the full length of the blade 16. Integral with and projecting upwardly from the base 22 are side walls 24, these being coextensive in length with base 22 and being provided, intermediate their upper and lower longitudinal edges, with convergent portions 26 merging at their convergent ends into flat parts 28 spaced closely apart. Normally, when the protective device is disengaged from the saw blade, the parts 28 are spaced apart a distance less than the thickness of the saw blade, so that they will be spread by the saw blade when the device is attached thereto.

Integrally formed upon the base 22, between the side walls 24, and extending medially between the side walls is an upstanding rib 30 having the cross section of an isosceles triangle. The cross sectional shape of the rib forms the rib into a blade-like member, the sharpened, free edge of which engages in the downwardly opening groove defined by the oppositely set teeth 18, 20. The rib 30 is coextensive in length with the side walls and web portion. When the device is applied to the saw blade, it will be seen from Figure 3 that the toothed cutting edge of the blade engages rib 30, and the opposite faces of the blade engage the parts 28. Thus, the three-point contact between the blade and guard interengages the same against relative lateral movement. The rib 30, of course, insures that the toothed cutting edge will be held out of contact with the web portion or base 22, and also out of contact with the side walls 24.

One end of the protective device can be beveled, to facilitate its being slipped over one end of the saw blade 16. Once the device has been engaged with the saw blade in this manner, the blade spreads the walls 24 against the inherent elasticity thereof, said inherent elasticity being such as to maintain the walls in frictional engagement with the opposite faces of the saw blade. The protective device is now shifted longitudinally of the blade so as to be substantially coextensive in length with the blade 16 as shown in Figure 1, and this will protectively enclose the toothed edge of the saw over the full length thereof.

The formation of the device is such as to permit it to be formed by an extrusion process, since the cross sectional shape, as will be apparent, is unchanging over the full length of the protective device. This permits the device to be manufactured at relatively low cost, and it is important to note that the construction is such as to cause the device to be made from a single piece of material, and to be devoid of any special connecting means for interengaging the same with the saw blade.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrated of the principles, it being considered that the invention comprehends any minor change in construction that may be permitted within the scope of the appended claims.

What is claimed is:

1. In a guard for a saw blade having a straight, toothed cutting edge, formed with oppositely set teeth, an elongated body formed to a U-shaped cross section so as to straddle said edge, said body including a web portion and a pair of side walls extending along the opposite longitudinal edges of said portion, said side walls being adapted to frictionally engage against opposite faces of the blade, the web portion including a rib extending between the side walls and adapted to engage said cutting edge, said rib being of triangular cross section so as to engage between the oppositely set teeth of said blade.

2. In a guard for a saw blade having a straight, toothed, cutting edge, formed with oppositely set teeth, an elongated body open at its ends and formed to a U-shaped cross section so as to be slidable onto said edge in straddling relation thereto, said body including a web portion and a pair of side walls extending along the opposite longitudinal edges of said portion, the side walls converging in a direction away from the web portion and having, along the edges thereof remote from the web portion, flat parts spaced closely apart and binding frictionally against opposite faces of the saw blade to hold the guard upon the saw blade, the web portion including a rib extending in parallelism with the side walls over the full length of the body and disposed medially between the side walls, said rib tapering in cross section in a direction away from the web portion to engage against said cutting edge of the saw blade between the oppositely set teeth thereof.

References Cited in the file of this patent

UNITED STATES PATENTS

| 2,517,649 | Frechtmann | Aug. 8, 1950 |

FOREIGN PATENTS

| 13,751 | Great Britain | of 1895 |
| 633,605 | Germany | July 3, 1936 |